Sept. 5, 1944.   R. R. DONALDSON   2,357,310
PRESSURE-ACTUATED VALVE AND VIBRATION DAMPING MEANS THEREFOR
Filed June 10, 1940
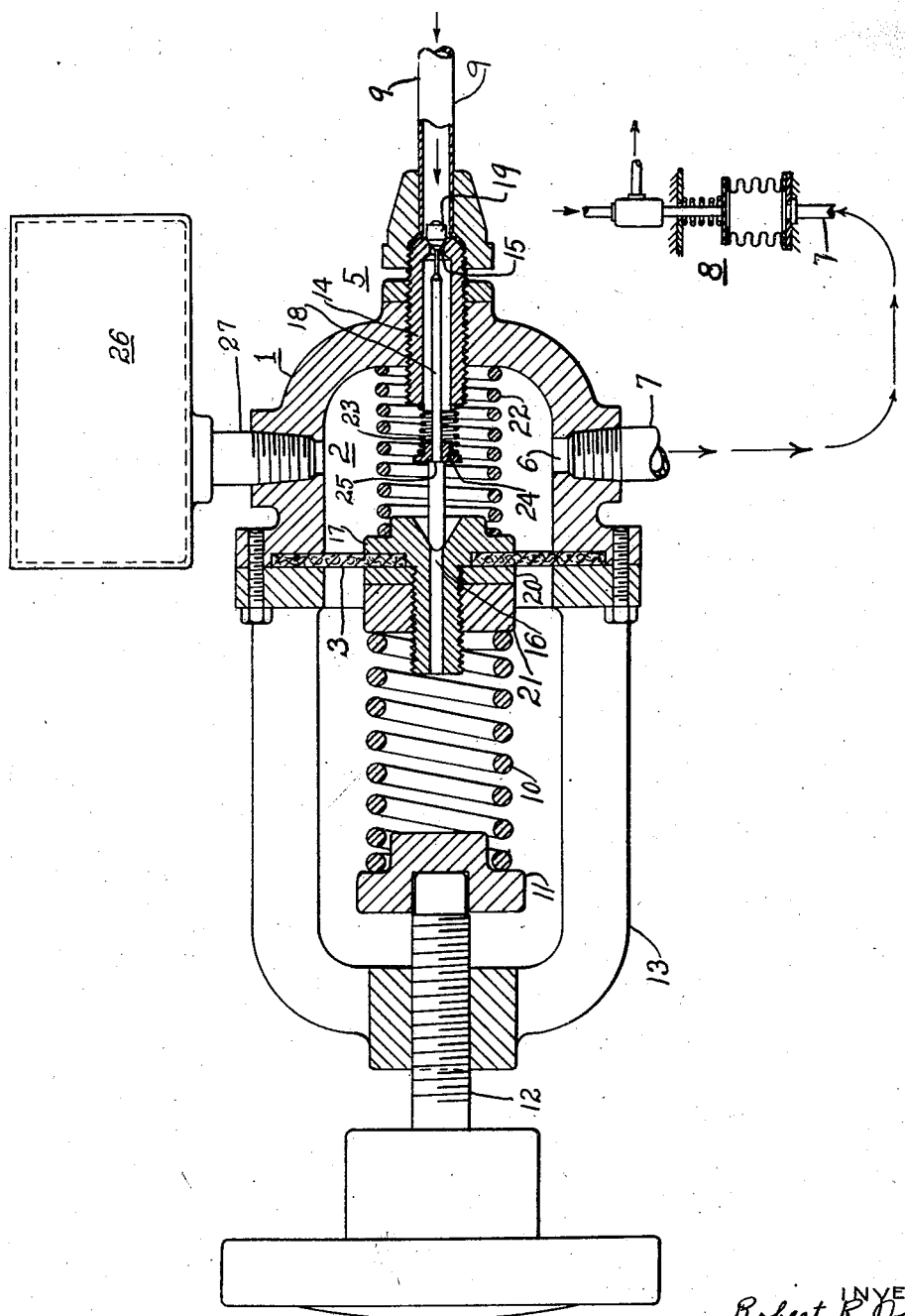
INVENTOR
Robert R. Donaldson
by Gerald B. Tjoflat
his attorney Patented Sept. 5, 1944

2,357,318

UNITED STATES PATENT OFFICE 2,357,318

PRESSURE-ACTUATED VALVE AND VIBRATION DAMPING MEANS THEREFOR

Robert R. Donaldson, Pittsburgh, Pa., assignor to John M. Hopwood, Mount Lebanon, Pa.

Application June 10, 1940, Serial No. 339,694

1 Claim. (Cl. 50—23)

This invention relates to valves adapted to deliver a pressure medium such as compressed air, for example, from a supply source to a sending line at variable or controlled pressures and more particularly to valves of the diaphragm non-vibrating type.

An object of the invention is to provide a valve that shall be simple in construction, require small travel to open or close it, and provided with means to render the valve non-vibrating.

Another object of the invention is to provide a valve that may be actuated by yielding forces of variable magnitude and caused to transmit pressures proportional to the value of the actuating forces, and at the same time operate to automatically maintain the transmitted pressure constant at any value called for by the actuating force.

The above and other objects of the invention will be apparent to those skilled in this art from the following description taken in conjunction with the accompanying drawing in which the single figure is a view mainly in section, and partly in full, of a valve arranged and constructed in accordance with an embodiment of the invention, the view including also a more or less diagrammatic illustration of a device connected for operation in accordance with the pressure sent out thereto by the valve.

The valve assembly shown in the drawing comprises a body or housing 1 having a chamber 2 and a pressure-sensitive member 3 mounted to be subject to pressure in chamber 2. The valve assembly includes a valve 5 adapted to admit pressure medium, such as compressed air, into chamber 2 or to exhaust pressure medium therefrom. The pressure medium in chamber 2 is delivered to an outlet 6 to a sending line 7 serving a device 8 to be actuated by and in accordance with the value of pressure delivered. The valve is connected to a supply pipe 9 to which the pressure medium is delivered from a supply source (not shown).

The value of pressure that will be transmitted by valve 5 to sending line 7 will be dependent upon the value of the yielding force which is applied to actuate the valve. The yielding force may be applied to member 3 in a direction such that the valve will open and admit pressure into chamber 2 until the force of the pressure acting on the pressure-sensitive member 3 balances the value of the yielding actuating force. The yielding actuating force may be supplied for example by means of a spring 10 which is mounted with one end bearing against pressure-sensitive member 3 and with its other end bearing against a cap 11 which may be moved by means of an adjusting screw 12 to vary the compression of the spring. The adjusting screw is threaded into a spider or cage 13 which is bolted to the housing 1 and which serves also to clamp the outer edges of pressure-sensitive member 3 tightly against the housing.

If the yieldable or yielding actuating means 10 exerts a predetermined force on the pressure-sensitive member 3 then valve 5 will be operated in such direction as to establish a pressure in chamber 2 that will exert a force on pressure-sensitive member 3 equal and opposite to the force of the yielding means. When this balance occurs the inlet and exhaust ports of the valve are closed. If for any reason the pressure in chamber 2 or in the sending line should decrease without any change in the spring compression or the value of the actuating force, the valve will be opened to admit pressure medium into chamber 2 until a balance is restored between the force of the pressure and the force of the actuating means.

Valve 5 comprises a valve body 14 threaded into housing 1 and provided with an inlet port 15, an exhaust port 16 formed in a member 17 carried by a member 3, and a valve stem 18. Valve stem 18 is located within valve body 14 and is provided with an element 19 adapted to seat on and close the inlet port, when the pressure in chamber 2 has been established at a value that will balance the force of spring 10. The inner end of the valve stem is positioned to seat in and close the exhaust port 16.

The exhaust port as shown is formed in member 17 which is shaped somewhat like a bolt and provided with a relatively wide flanged head that bears on the chamber side of member 3. The shank of member 17 extends through the central portion of the pressure-sensitive member 3 and is threaded to accommodate a washer or backing plate 20 and a nut 21 which is drawn up tight to clamp the pressure-sensitive member tightly and form a pressure-tight joint. Compression spring 10 urges pressure-sensitive member 3 in a direction to open valve port 15, that is in a direction to lift element 19 off the inlet port. If desired, the pressure-sensitive member may also be urged in a direction opposite to that by which it is urged by spring 10 by means of a spring 22 which will cause the pressure-sensitive member 3 to assume a neutral position when spring 10 is adjusted to exert an equal and opposite force on the pressure-sensitive member.

When in neutral position valve body 14 may be easily adjusted to insure that the valve stem properly seats on and closes the inlet and exhaust ports.

The exhaust port is formed by drilling the shank of member 17 and making the chamber end of the passage tapered or funnel-like in shape so that the inner end of valve stem 19 will be centered and guided into the proper seating position. Valve stem 18 may be urged in a direction tending to close the inlet port by means of a relatively light compression spring 23. This spring is mounted about the valve stem with one end pressing against the inner end of valve body 14 and with its opposite end resting on a flanged collar 24 supported on a shoulder 25 of the valve stem.

Assuming that the valve body has been properly positioned in housing 1 and that spring 10 has been adjusted until it exerts a force equal to that exerted by spring 22 and that the inlet and exhaust ports 16 and 15 of the valve are closed, then if the compression of spring 10 is adjusted to a value exceeding that of spring 22, the pressure-sensitive member 3, the exhaust port member 16, and valve stem 18 will move together whereby element 19 is lifted off the inlet port 15. Pressure medium from supply pipe 9 will then flow into chamber 2 and as the pressure builds up within it, a force will be exerted on pressure-sensitive member 3 until the force exerted by it on member 3 balances the opposing force of spring 10. If the valve opens the inlet port widely so that pressure builds up rapidly within chamber 2, pressure-sensitive member 3 is likely to be accelerated rapidly under the influence of this pressure and to overcompress spring 10, allowing the exhaust port to move away from the inner end of valve stem 18, and allowing pressure medium to escape from chamber 2, thereby reducing the pressure therein. When this pressure is reduced, spring 10 will exert a yielding force tending to open the valve and this action is likely to result in over-travel and vibration, the frequency of which will vary with the stiffness of springs 10 and 22, the inertia of the moving parts as well as the frictional resistance of pressure-sensitive member 3 and the other moving parts. To overcome and prevent such vibration, a volume chamber 26 is provided which is connected to the interior of chamber 2 by means of a pipe or connecting member 27. Thus as the pressure is admitted to chamber 2 the pressure medium will also flow into the volume chamber 26.

I have found by experiment and experience that this vibration will not be damped out if the volume of chamber 2 is increased by the amount of the volume of a separate volume chamber that will damp out such vibration. I have also found that vibration of the valve may be completely prevented by utilizing a volume tank or chamber having a volume of about three times the volume of the chamber 2. The length of the pipe connection 27 between the volume chamber and chamber 2 also enters into the effectiveness of the damping action of the volume chamber. By experience and experimentation, I have found that pipe connection 27 should be short so that the resistance thereof to the flow of pressure medium to or from the volume chamber is negligible compared to the resistance to flow of pressure medium through the inlet and exhaust ports of the valve.

Volume chamber 26 acts as a damper or damping device because of the stabilizing effect which it imposes upon pressure-sensitive member 3 is substantially 180° out of phase with the forces set up by the springs and the pressure admitted to chamber 2.

While I have shown the valve as being operated by a mechanical yielding actuating force, it will be apparent that this yielding mechanical actuating force may be supplemented in part by a pressure-medium applied to the diaphragm on the same side as the force is applied by this spring.

The type of valve shown is sensitive and non-sticking and requires extremely small travel to either fully open the inlet port or close the inlet port and fully open the exhaust port. This travel can be as small as one thousandth (0.001) of an inch.

Having thus described the invention, it will be apparent to those skilled in the art that various modifications and changes may be made in the illustrated embodiment without departing either from the spirit or the scope of the principles of the invention.

Therefore what I claim as new and desire to secure by Letters Patent is:

A valve of the diaphragm-operated type comprising a housing having a chamber therein, a diaphragm in the chamber adapted to be flexed by an elastic pressure medium delivered to said chamber, means yieldingly engaging said diaphragm and exerting a force opposed to that exerted by the pressure medium on said diaphragm, and valve means actuated by said diaphragm for delivering pressure medium to or exhausting it from said chamber to maintain the force of pressure on said diaphragm that balances the opposing force of said yielding means, said valve comprising a member carried by said diaphragm and having an exhaust port therein, the seat for said port being on the chamber side of the diaphragm, a valve body on said housing, said body having an inlet port adapted to be connected to a source of pressure medium, a valve stem disposed within said valve body and having an end thereof extending into the exhaust port seat and having a portion thereof arranged to seat on the inlet port, said valve stem being moved by said diaphragm to uncover the inlet port, means yieldingly urging said stem to a position closing the inlet port when the diaphragm moves the exhaust port seat away from the valve stem, a volume chamber connected to the interior of said housing chamber, the volume of said volume chamber being materially greater than the volume of the housing chamber, the connection between said housing and volume chambers being such that the resistance to flow of pressure medium therethrough is negligible in comparison with the resistance to flow of pressure medium through the inlet and exhaust ports, whereby vibration of the valve is prevented, and an outlet for said housing chamber to which a device to be actuated in accordance with the pressure in said housing chamber may be connected.

ROBERT R. DONALDSON.